(12) United States Patent
Liu et al.

(10) Patent No.: US 9,342,723 B2
(45) Date of Patent: May 17, 2016

(54) ENCODED INFORMATION READING TERMINAL WITH MULTIPLE IMAGING ASSEMBLIES

(71) Applicant: Honeywell International, Inc., Fort Mill, SC (US)

(72) Inventors: Yong Liu, Suzhou (CN); Ynjiun Paul Wang, Cupertino, CA (US); Xi Tao, Suzhou (CN)

(73) Assignee: Honeywell International, Inc., Fort Mill, SC (US)

( * ) Notice: Subject to any disclaimer, the term of this patent is extended or adjusted under 35 U.S.C. 154(b) by 60 days.

(21) Appl. No.: 14/032,921

(22) Filed: Sep. 20, 2013

(65) Prior Publication Data

US 2014/0166755 A1 Jun. 19, 2014

(30) Foreign Application Priority Data

Sep. 27, 2012 (CN) .......................... 2012 1 0373426

(51) Int. Cl.
*G06K 7/10* (2006.01)

(52) U.S. Cl.
CPC ................................. *G06K 7/10722* (2013.01)

(58) Field of Classification Search
CPC .................................................. G06K 7/10722
USPC .................. 235/440, 462.07, 462.09, 462.11, 235/462.24, 462.41
See application file for complete search history.

(56) References Cited

U.S. PATENT DOCUMENTS

| 7,748,631 | B2 | 7/2010 | Patel et al. |
| 8,033,472 | B2 | 10/2011 | Giebel et al. |
| 8,066,188 | B2 | 11/2011 | Patel et al. |
| 8,146,821 | B2 | 4/2012 | Barkan et al. |
| 8,256,680 | B2 | 9/2012 | Lawson et al. |
| 2009/0084856 | A1 | 4/2009 | Vinogradov et al. |
| 2009/0121027 | A1 | 5/2009 | Nadabar |
| 2009/0206161 | A1 | 8/2009 | Olmstead |
| 2010/0019042 | A1 | 1/2010 | Barkan |
| 2010/0127082 | A1 | 5/2010 | Drzymala |
| 2010/0163627 | A1 | 7/2010 | Olmstead |
| 2010/0163628 | A1 | 7/2010 | Olmstead |
| 2010/0165160 | A1 | 7/2010 | Olmstead et al. |
| 2010/0237150 | A1 | 9/2010 | Patel et al. |
| 2010/0252633 | A1 | 10/2010 | Barkan et al. |
| 2010/0282850 | A1 | 11/2010 | Olmstead et al. |
| 2011/0078706 | A1 | 3/2011 | Lawson et al. |
| 2011/0233278 | A1 | 9/2011 | Patel et al. |
| 2011/0286628 | A1 | 11/2011 | Goncalves et al. |
| 2013/0327831 | A1* | 12/2013 | Howard ........................ 235/440 |

* cited by examiner

*Primary Examiner* — Kristy A Haupt
(74) *Attorney, Agent, or Firm* — Additon, Higgins & Pendleton, P.A.

(57) ABSTRACT

An encoded information reading (EIR) terminal can comprise a microprocessor, a communication interface, an image processing circuit communicatively coupled to the microprocessor, a plurality of imaging assemblies communicatively coupled to the image processing circuit, and one or more memory blocks communicatively coupled to the image processing circuit. Each imaging assembly of the plurality of imaging assemblies can be configured to output image frame data. The image processing circuit can be configured to receive the image frame data from at least one imaging assembly, buffer the image frame data received from at least one imaging assembly in at least one memory block, and/or process the image frame data received from at least one imaging assembly. The EIR terminal can be configured to output image frame data comprising decodable indicia and/or decoded message data corresponding to the decodable indicia.

20 Claims, 6 Drawing Sheets

ENCODED INFORMATION READING TERMINAL WITH MULTIPLE IMAGING ASSEMBLIES

CROSS REFERENCE TO RELATED APPLICATIONS

This application claims the benefit of priority under 35 U.S.C. §119 from Chinese Patent Application No. 201210373426.2 filed Sep. 27, 2012 in The State Intellectual Property Office of the People's Republic of China (SIPO). The above application (Chinese Patent Application No. 201210373426.2 filed Sep. 27, 2012 in SIPO) is incorporated herein by reference in its entirety.

FIELD OF THE INVENTION

This invention relates generally to encoded information reading (EIR) terminals and, more specifically, to EIR terminals comprising one or more EIR devices.

BACKGROUND OF THE INVENTION

Various types of encoded information reading (EIR) terminals, such as hand-held bar code scanners, hands-free scanners, bi-optic in-counter scanners, RFID readers, and mobile computers such as personal digital assistants (PDAs), are widely used in retail, manufacturing, and other environments requiring article identification. Optical EIR terminals typically utilize a lens to focus the image of the decodable indicia, such as a bar code, onto a multiple pixel image sensor, which is often provided by a complementary metal-oxide semiconductor (CMOS) image sensor that converts light signals into electric signals.

SUMMARY OF THE INVENTION

In one illustrative embodiment, there is provided an EIR terminal comprising a microprocessor, a communication interface, an image processing circuit communicatively coupled to the microprocessor, a plurality of imaging assemblies communicatively coupled to the image processing circuit, and one or more memory blocks communicatively coupled to the image processing circuit. Each imaging assembly of the plurality of imaging assemblies can be configured to output image frame data. The image processing circuit can be configured to receive the image frame data from at least one imaging assembly, buffer the image frame data received from at least one imaging assembly in at least one memory block, and/or process the image frame data received from at least one imaging assembly. The EIR terminal can be configured to output image frame data comprising decodable indicia and/or decoded message data corresponding to the decodable indicia.

In a further aspect, each imaging assembly can comprise a two-dimensional image sensor configured to output an analog signal representative of light reflected by an object located within the field of view of the imaging assembly, an amplifier configured to output an amplified analog signal by amplifying an analog signal read out of the image sensor, and an analog-to-digital (A/D) converter configured to convert the analog signal into a digital signal representing the image frame data.

In a further aspect, the image processing circuit can be configured to simultaneously communicate with at least two imaging assemblies and/or simultaneously communicate with at least two memory blocks.

In a further aspect, at least one imaging assembly can be communicatively coupled to the image processing circuit via a parallel interface or a serial interface.

In a further aspect, at least one imaging assembly can include a monochrome image sensor or a color image sensor.

In a further aspect, processing of the image frame data received from at least one imaging assembly can comprise filtering the image frame data and/or extracting a part of the image frame data.

In a further aspect, the image processing circuit can be provided by a field-programmable gate array (FPGA) or an application-specific integrated circuit (ASIC).

In a further aspect, the image processing circuit can be configured to receive at least one image processing command from the microprocessor.

In a further aspect, the image processing circuit can be communicatively coupled to the microprocessor via a memory, or a memory-like interface.

In a further aspect, the communication interface can be provided by a wired communication interface and/or a wireless communication interface.

In another illustrative embodiment, there is provided an encoded information reading (EIR) terminal comprising a microprocessor, a communication interface, an image processing circuit communicatively coupled to the microprocessor, and a plurality of imaging assemblies of communicatively coupled to the image processing circuit via a standardized interface. Each imaging assembly can be configured to output image frame data in a common format required by the standardized interface. Each imaging assembly can comprise a two-dimensional image sensor configured to output an analog signal representative of the light reflected by an object located within the field of view of the imaging assembly. The image processing circuit can be configured to receive the image frame data from at least one imaging assembly. The EIR terminal can be configured to output image frame data comprising decodable indicia and/or decoded message data corresponding to the decodable indicia.

In a further aspect, the standardized interface can be provided by a parallel interface (e.g., MIPI camera parallel interface) or a serial interface (e.g., MIPI camera serial interface).

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

"Communication network" or "network" herein shall refer to a set of hardware and software components implementing a plurality of communication channels between two or more computers. A network can be provided, e.g., by a local area network (LAN), or a wide area network (WAN). While different networks can be designated herein, it is recognized that a single network as seen from the network layer of the OSI model can comprise a plurality of lower layer networks, i.e., what can be regarded as a single Internet Protocol (IP) network, can include a plurality of different physical networks.

"Computer" herein shall refer to a programmable device for data processing, including a central processing circuit (CPU), a memory, and at least one communication interface. For example, in one embodiment, a computer can be provided by an Intel-based server running Linux operating system. In another embodiment, a computer can be provided by a virtual server, i.e., an isolated instance of a guest operating system running within a host operating system. In a yet another embodiment, a computer can be provided by an encoded information reading (EIR) terminal. In a yet another embodiment, a computer can be provided by a personal digital assistant (PDA). In a yet another embodiment, a computer can be provided by a smartphone.

"Decodable indicia" herein shall refer to an encoded representation, such as the representation in a bar code symbology, of a message string comprising alphanumeric and non-alphanumeric characters. Decodable indicia can be used to convey information, such as the identification of the source and the model of a product, for example in a EPC bar code that can comprises a plurality of encoded symbol characters representing numerical digits.

Encoded information reading (EIR) terminals can be used, for example, for bar code reading and decoding in point-of-sale (POS) and other applications. A product bearing decodable indicia can be scanned by an EIR terminal. The EIR terminal disclosed herein can be employed to acquire and decode images of decodable indicia. The EIR terminal can be configured to output raw image data containing decodable indicia and/or a decoded message corresponding to the decodable indicia.

Due to operational requirements, an EIR terminal may need to comprise two or more two-dimensional imaging assemblies. In the traditional imaging device architecture, image acquisition and/or processing functions are usually performed by the CPU. Due to heavy computational load upon the CPU, supporting multiple imaging assemblies would require multiple processors, thus leading to a prohibitively high cost of the EIR terminal. Furthermore, the interface between the image sensor and the processor would have to be image-sensor specific, thus restricting the types of image sensors which can be used.

To address the above noted deficiencies, in one embodiment, there is provided an EIR terminal comprising an image processing circuit communicatively coupled to one or more imaging assemblies. The image processing circuit can be provided, e.g., by a field-programmable gate array (FPGA) or an application-specific integrated circuit (ASIC). An imaging assembly can comprise an image sensor and associated circuitry, including amplifiers and A/D converters, and thus can be capable of outputting a digital signal representing the image frame data. The image processing circuit can be configured to acquire and process images from several imaging assemblies, and store the acquired images in one or more memory blocks communicatively coupled to the image processing circuit.

In a further aspect, the imaging assemblies can be communicatively coupled to the image processing circuit via a standardized interface (e.g., MIPI camera serial interface or MIPI camera parallel interface). Due to the standardized nature of the interface employed to communicatively coupled the imaging assemblies to the image processing circuit, other components of EIR terminal can be agnostic with respect to the type and/or functional characteristics of the imaging assemblies or image sensors used.

In a further aspect, the image processing circuit can be communicatively coupled to the CPU via a memory or a memory-like interface. The CPU can be programmed to issue image retrieval and/or processing commands to the image processing circuit.

Of course, devices that read bar codes, read RFID, or read cards bearing encoded information may read more than one of these categories while remaining within the scope of this disclosure. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is an EIR terminal for purposes of this disclosure.

Figure 1A:
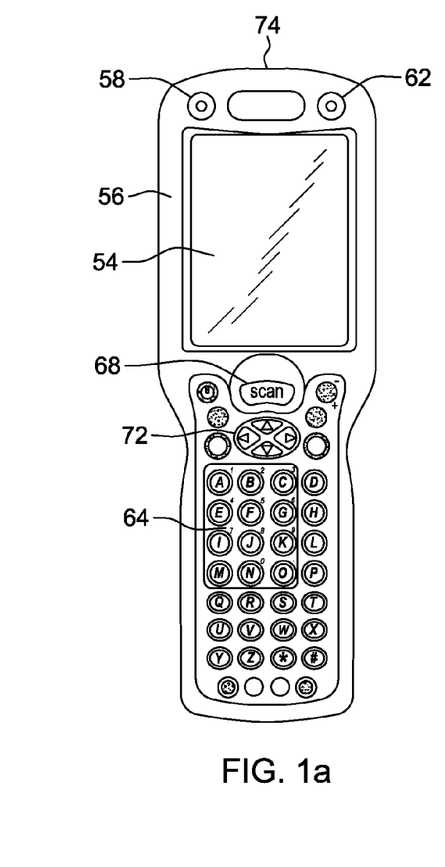
FIGS. 1a-1c schematically illustrate one embodiment of the EIR terminal described herein.
Figure 1B:
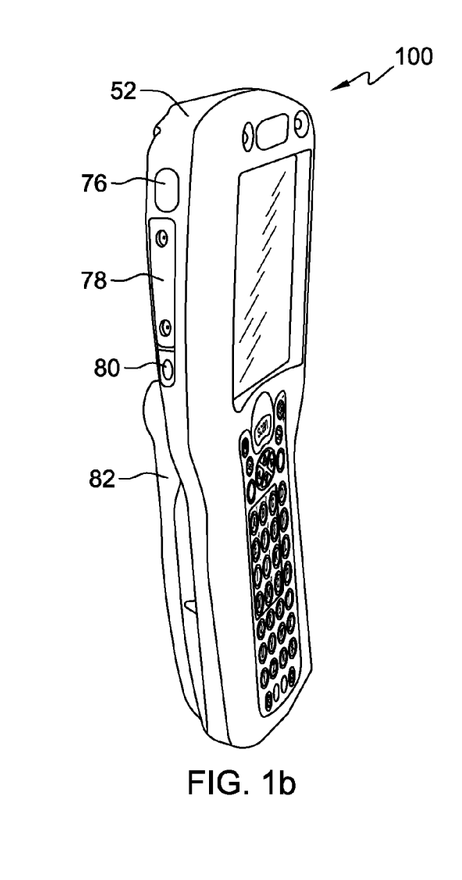
Figure 1C:
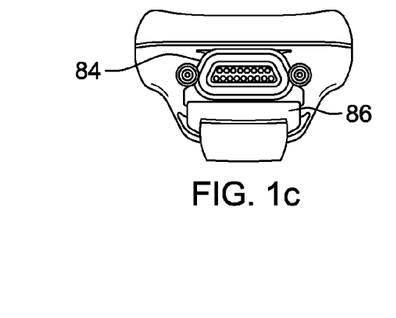

One embodiment of EIR terminal described herein is shown in FIGS. 1a (front panel view), 1b (side panel view), and 1c (bottom panel view). EIR terminal 100 can comprise housing 52 within which other components of EIR terminal 100 can be disposed. LCD screen display with touch screen sensor 54 can be disposed on the front panel 56. Also disposed on front panel 56 can be decode LED 58, scan led 62, and keyboard 64 including scan key 68 and navigation keys 72. Imaging window 74 can be disposed on the top panel of housing 52. Disposed on the side panel (best viewed in FIG. 1b) can be infra-red communication port 76, access door to a secure digital (SD) memory interface 78, audio jack 80, and hand strap 82. Disposed on the bottom panel (best viewed in FIG. 1c) can be multi-pin mechanical connector 84 and hand strap clip 86.

Figure 2:
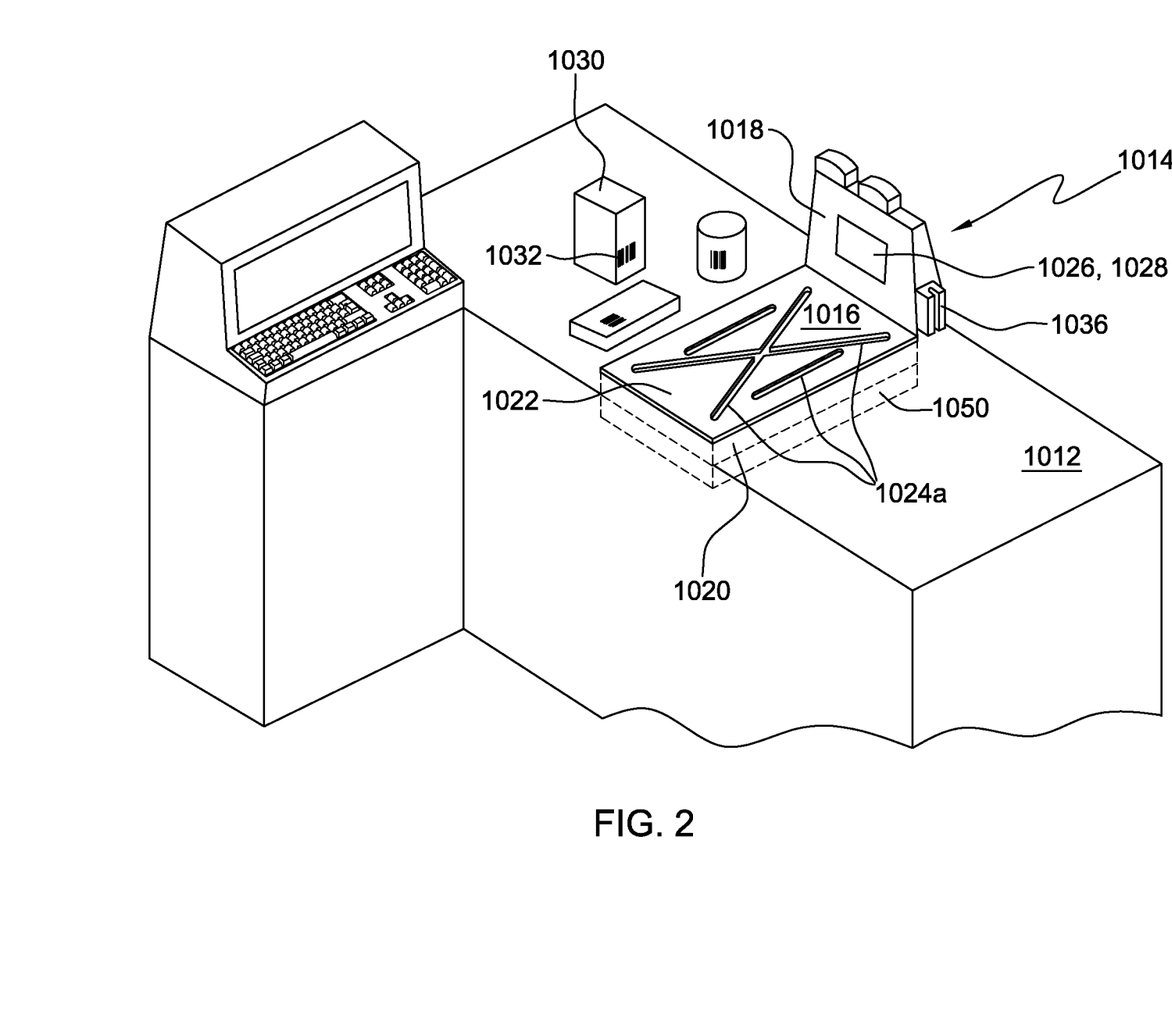
FIG. 2 schematically illustrates one embodiment a point-of-sale workstation comprising an EIR terminal described herein.

In another illustrative embodiment, schematically shown in FIG. 2, the EIR terminal can be incorporated into a POS workstation with a presentation housing. The workstation 1010 can include a horizontal countertop 1012 for placement of products to be scanned. A bioptic scanner 1014 mounted within the countertop 1012 can include a first housing portion 1016 and a second housing portion 1018 which can project from one end of the first housing portion in a substantially orthogonal manner. In one embodiment, the first housing portion 1016 can comprise a first imager-based terminal and the second housing portion 1018 can comprise a second imager-based terminal. The countertop 1012 can include an optically transparent (e.g., glass) horizontal-scanning window 1020 mounted flush with the checkout counter, covered by an imaging window protection plate 1022 which can be provided with a pattern of apertures 1024a. The second housing portion 1018 can further include a vertical-scanning window 1026 behind which an imager-based indicia reading terminal 1028 can be housed. A skilled artisan would appreciate the fact that other ways of disposing the scanners and scanning windows are within the scope of this disclosure.

In one embodiment, the workstation 1010 can further include a radio frequency identification (RFID) reader 1034; a credit card reader 1036; a wide-area wireless (WIFI) interface 1038 including RF transceiver and antenna 1040; a Bluetooth 2-way communication interface 1044 including RF transceivers and antenna 1046 for connecting to Bluetooth-enabled hand-held scanners, imagers, PDAs, portable computers and the like 1048, for control, management, application and diagnostic purposes. The workstation 1010 can further include an electronic weight scale module 1050 employing one or more load cells positioned centrally below the system's structurally rigid platform for bearing and measuring substantially all of the weight of objects positioned on the horizontal-scanning window 1020 or window protection plate 1022, and generating electronic data representative of measured weight of such objects.

Figure 3A:
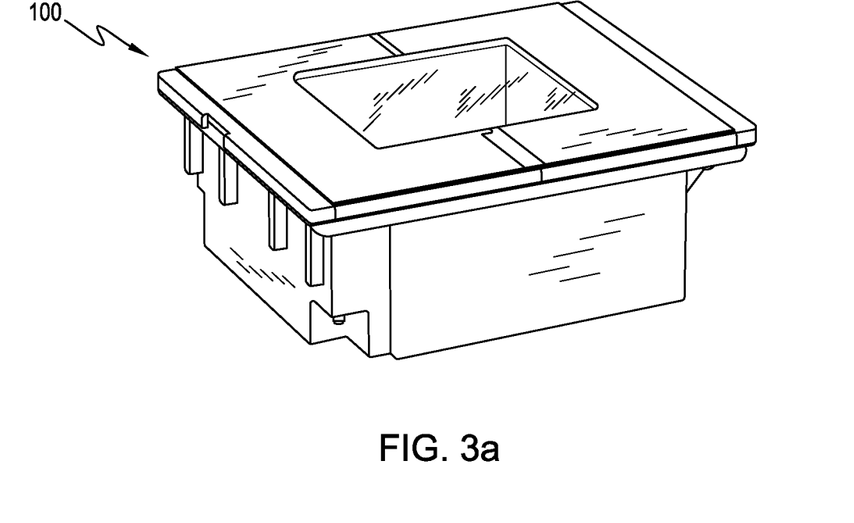
FIGS. 3a-3b schematically illustrate omnidirectional scanners.
Figure 3B:
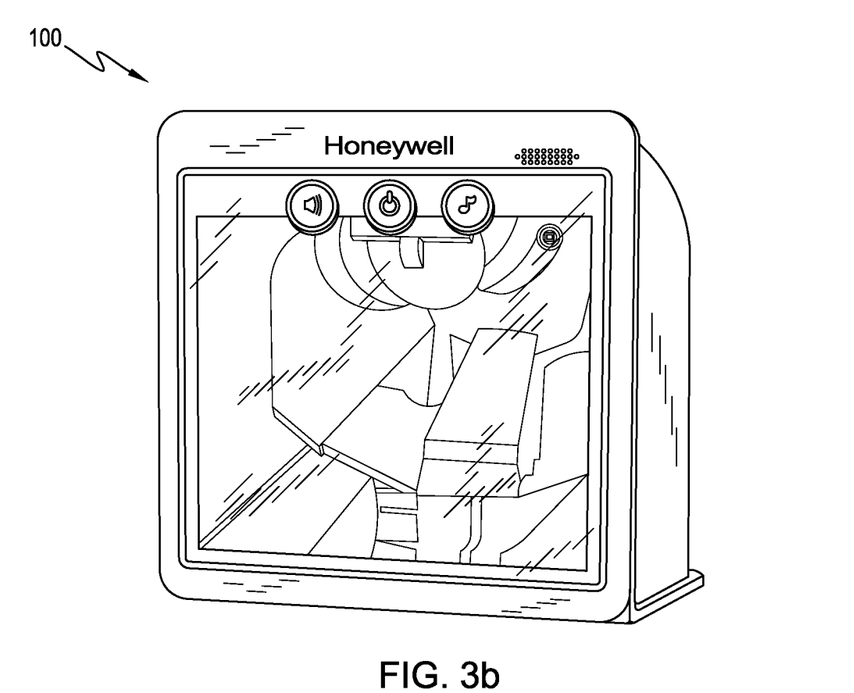

In another illustrative embodiment, the EIR terminal described herein can be provided by an omnidirectional scanner schematically depicted in FIGS. 3a-3b. A skilled artisan would appreciate the fact that other types and form factors of terminal housings are within the scope of this disclosure.

Figure 4:
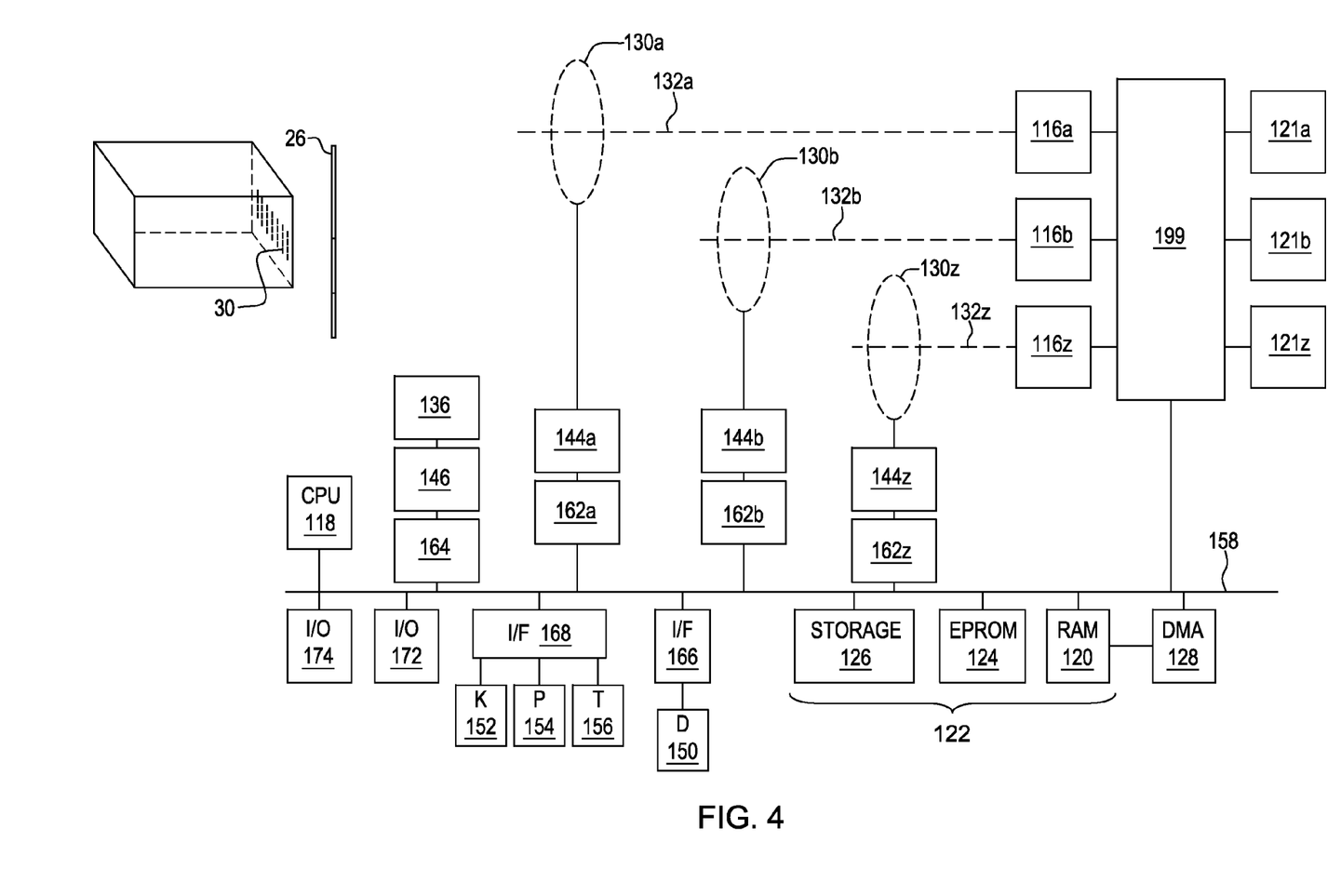
FIG. 4 schematically illustrates a component diagram of one embodiment of the EIR terminal described herein.

Referring now to FIG. 4, described is a component diagram of one illustrative embodiment of the EIR terminal 100. EIR terminal 100 can comprise an image processing circuit 199 configured to acquire and process images from one or more imaging assemblies 116a-116z, and store the acquired images in one or more memory blocks 121a-121z communicatively coupled to image processing circuit 199. In some embodiments, at least one imaging assembly 116 can be communicatively coupled to image processing circuit 199 via a serial interface (e.g., MIPI-CSI interface). In some embodiments, at least one imaging assembly 116 can be communicatively coupled to image processing circuit 199 via a parallel interface. A skilled artisan would appreciate the fact that other type of interfaces employed for coupling imaging assemblies 116a-116z to image processing unit 199 are within the scope of this disclosure.

Figure 5:
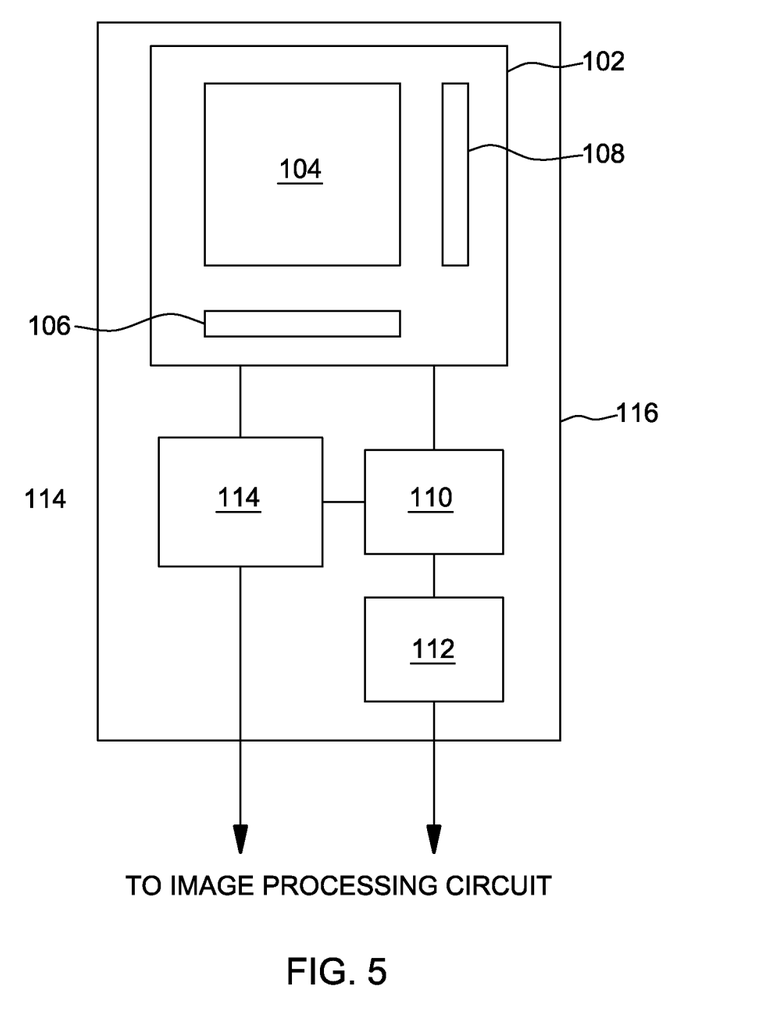
FIG. 5 schematically illustrates a component diagram of one embodiment of imaging assembly incorporated into the EIR terminal described herein.

FIG. 5 schematically depicts a component diagram of one embodiment of imaging assembly 116 comprising an image sensor 102 which can be provided, e.g., by a CCD image sensor or a CMOS image sensor. Image sensor 102 can in turn comprise a multiple pixel image sensor array 104 having pixels arranged in rows and columns of pixels, column circuitry 106, and row circuitry 108. Image sensor 102 can be configured to output analog signals representative of light reflected by an object located within the field of view of image sensor 102. In some embodiments, image sensor 102 can be provided by a color image sensor. In some embodiments, image sensor 102 can be provided by a monochrome image sensor.

Associated with image sensor 102 can be amplifier 110 configured to amplify the analog signals read out of multiple pixel image sensor array 104. Also associated with image sensor 102 can be analog-to0-digital (A/D) converter 112 configured to convert the analog signals outputted by amplifier 110 into a digital signal comprising the image frame data. Image sensor 102 can also have an associated timing and control circuit 114 for use in controlling, e.g., the exposure period of image sensor 102, and/or gain applied to the amplifier 110. The noted circuit components 102, 110, 112, and 114 can be packaged into a common imaging assembly integrated circuit 116.

Referring again to FIG. 2, image processing circuit 199 can be communicatively coupled to microprocessor 118 via a memory or a memory-like interface. Microprocessor 118 can be provided by a general purpose microprocessor or by a specialized microprocessor (e.g., an ASIC). In some embodiments, EIR terminal 100 can comprise a single microprocessor which can be referred to as a central processing circuit (CPU). Alternatively, EIR terminal 100 can comprise two or more microprocessors, for example, a CPU providing some or most of the EIR terminal functionality and a specialized microprocessor performing some specific functionality. A skilled artisan would appreciate the fact that other schemes of processing tasks distribution among two or more microprocessors are within the scope of this disclosure.

In a further aspect, EIR terminal 100 can include a direct memory access unit (DMA) 128 for routing image frame data read out from image processing circuit 199 to RAM 120. Alternatively, EIR terminal 100 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer are within the scope of this disclosure.

In the course of operation of the EIR terminal 100, image processing circuit 199 can receive image frame data from at least one imaging assembly 116a-116z and store the received image frame data in one or more memory blocks 121a-121z. In some embodiments, image processing circuit 199 can process the image frame data, e.g., by filtering the data, converting the color image data into grayscale or binary image data, locating one or more regions of interest within the image frame, cropping the image frame, zooming at least a part of the image frame, and/or extracting at least a part of the image frame. In some embodiments, image processing circuit 199 can simultaneously receive and/or process the image frame data received from two or more imaging assemblies 116a-116z. In some embodiments, image processing circuit 199 can simultaneously store in two or more memory blocks 121a-121z the image frame data received from two or more imaging assemblies 116a-116z.

CPU 118 can be programmed to issue image retrieval and/or processing commands to image processing circuit 199. Responsive to receiving an image retrieval and/or image processing command, image processing circuit 199 can subject the image data to various image processing algorithms and/or transfer at least part of the image frame to memory 122. Memory 122 can include RAM 120, nonvolatile memory such as EPROM 124, and storage memory device 126 provided, e.g., by a flash memory or a hard drive memory.

Image retrieval commands issued by CPU 118 to image processing circuit 199 can include one or more commands to retrieve at least a part of the image frame data received by image processing circuit 199 from a specified imaging assembly 116a-116z. Image processing commands issued by CPU 118 to image processing circuit 199 can include one or more commands to filter the image frame data received by image processing circuit 199 from a specified imaging assembly 116a-116z, convert the color image data into grayscale or binary image data, locate one or more regions of interest within the image frame data received by image processing circuit 199 from a specified imaging assembly 116a-116z, crop the image frame data received by image processing circuit 199 from a specified imaging assembly 116a-116z, zoom at least a part of the image frame data received by image processing circuit 199 from a specified imaging assembly 116a-116z.

In a further aspect, microprocessor 118 can be configured to further process the image data stored in RAM 120 and to output the raw image data and/or to locate decodable indicia within the image and to output a decoded message corresponding to the decodable indicia.

Referring again to FIG. 2, EIR terminal 100 can include one or more imaging lens assemblies 130a-130z for focusing an image of the decodable indicia 30 onto the image sensor 102 of the respective imaging assembly 116a-116z. Imaging light rays can be transmitted about the optical axis 132a-132z to the respective image sensor.

Each lens assembly 130a-130z can be controlled with use of the respective lens assembly control circuit 144a-144z. Each lens assembly control circuit 144a-144z can send signals to the respective lens assembly 130a-130z, e.g., for changing a focal length and/or a best focus distance of respective lens assembly 130a-130z.

EIR terminal 100 can further comprise an illumination assembly 136 controlled by the illumination assembly control circuit 146. Illumination assembly control circuit 146 can be communicatively coupled to system bus 158 via interface 164.

In another aspect, EIR terminal 100 can comprise various interface circuits for coupling several of the peripheral devices to system bus 158, including interface circuits 162a-162z for coupling the respective lens assembly control circuits 144a-144z to system bus 158, interface circuit 164 for coupling the illumination assembly control circuit 146 to system bus 158, interface circuit 166 for coupling the display 150 to system bus 158, and interface circuit 168 for coupling keyboard 152, pointing device 154, and trigger 156 to system bus 158.

In another aspect, EIR terminal 100 can include one or more communication interfaces (including a wired communication interface 172 and/or a wireless communication interface 174) for providing communication with external devices (e.g., a POS cash register computer, a retail store server, an inventory facility server, a local area network base station, or a cellular base station). Wired communication interface can be provided by any combination of known wired communication interfaces, including, but not limited to, Ethernet (IEEE 802.3), USB, RS/232, and RS/485. Wireless communication interface can be provided by any combination of known wireless communication interfaces configured to support, including but not limited to, the following communication protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

In a further aspect, the EIR terminal can be incorporated in a data collection system. One embodiment of the data collection system, schematically shown in FIG. 6, can include a plurality of EIR terminals 100a-100z in communication with a plurality of interconnected networks 110a-110z.

Figure 6:
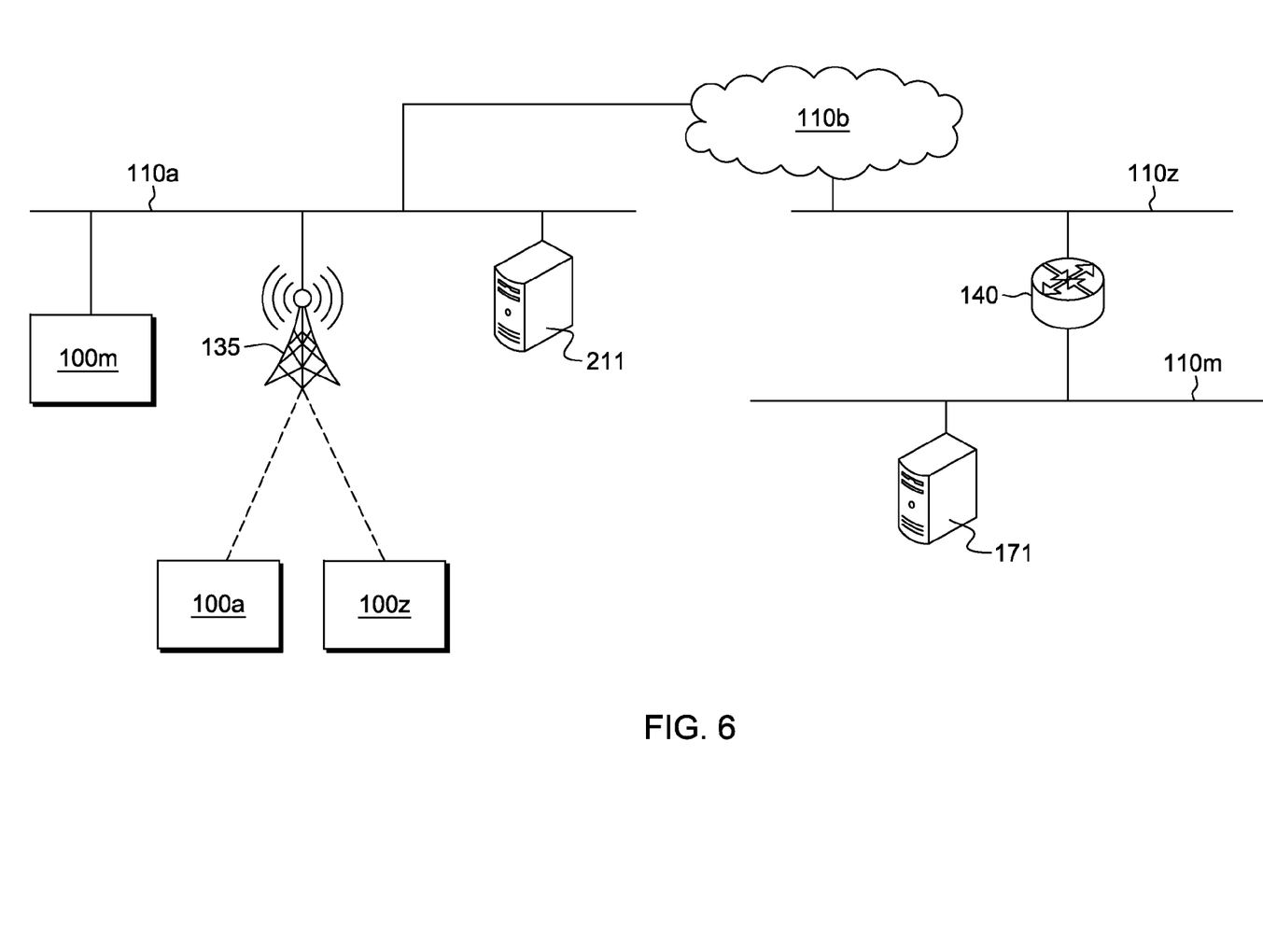
FIG. 6 schematically illustrates a network diagram of one embodiment of a data collection system employing EIR terminals described herein.

An EIR terminal 100a-100z can establish a communication session with an external computer 171. In one embodiment, network frames can be exchanged by the EIR terminal 100 and the external computer 171 via one or more routers 140, access points 135, and other infrastructure elements. In another embodiment, the external computer 171 can be reachable by the EIR terminal 100 via a local area network (LAN). In a yet another embodiment, the external computer 171 can be reachable by the EIR terminal 100 via a wide area network (WAN). In a yet another embodiment, the external computer 171 can be reachable by the EIR terminal 100 directly (e.g., via a wired or wireless interface). A skilled artisan would appreciate the fact that other methods of providing interconnectivity between the EIR terminal 100 and the external computer 171 relying upon LANs, WANs, virtual private networks (VPNs), and/or other types of network are within the scope of this disclosure.

The communications between the EIR terminal 100 and the external computer 171 can comprise a series of requests and responses transmitted over one or more TCP connections. A skilled artisan would appreciate the fact that using various transport and application level protocols is within the scope and the spirit of the invention.

In one illustrative embodiment, at least one of the messages transmitted by EIR terminal 100 to external computer 171 can comprise image frame data received from image processing circuit 199. In one illustrative embodiment, at least one of the messages transmitted by EIR terminal 100 to external computer 171 can comprise decoded message data corresponding to decodable indicia located within one or more images received from image processing unit 199.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

A sample of systems and methods that are described herein follows:

A1. An encoded information reading (EIR) terminal comprising:

a microprocessor;

a communication interface;

an image processing circuit communicatively coupled to said microprocessor;

a plurality of imaging assemblies communicatively coupled to said image processing circuit;

one or more memory blocks communicatively coupled to said image processing circuit;

wherein each imaging assembly of said plurality of imaging assemblies is configured to output image frame data;

wherein said image processing circuit is configured to perform at least one of: receiving said image frame data from at least one imaging assembly of said plurality of imaging assemblies, buffering said image frame data received from at least one imaging assembly of said plurality of imaging assemblies in at least one memory block of said one or more memory blocks, and processing said image frame data received from at least one imaging assembly of said plurality of imaging assemblies; and wherein said EIR terminal is configured to output at least one of: image frame data comprising decodable indicia and decoded message data corresponding to said decodable indicia.

A2. The EIR terminal of (A1), wherein each imaging assembly of said plurality of imaging assemblies comprises a two-dimensional image sensor configured to output an analog signal representative of light reflected by an object located within a field of view of said imaging assembly, an amplifier configured to output an amplified analog signal by amplifying an analog signal read out of said image sensor, and an analog-to-digital (A/D) converter configured to convert said analog signal into a digital signal representing said image frame data.

A3. The EIR terminal of (A1), wherein said image processing circuit is configured to simultaneously communicate with at least two imaging assemblies of said plurality of imaging assemblies.

A4. The EIR terminal of (A1), wherein said image processing circuit is configured to simultaneously communicate with at least two memory blocks of said one or more memory blocks.

A5. The EIR terminal of (A1), wherein at least one imaging assembly of said plurality of imaging assemblies is communicatively coupled to said image processing circuit via one of: a parallel interface, a serial interface.

A6. The EIR terminal of (A1), wherein at least one imaging assembly of said plurality of imaging assemblies includes a monochrome image sensor.

A7. The EIR terminal of (A1), wherein at least one imaging assembly of said plurality of imaging assemblies includes a color image sensor.

A8. The EIR terminal of (A1), wherein said processing of said image frame data received from at least one imaging assembly comprises at least one of: filtering said image frame data, extracting a part of said image frame data.

A9. The EIR terminal of (A1), wherein said image processing circuit is provided by one of: a field-programmable gate array (FPGA), an application-specific integrated circuit (ASIC).

A10. The EIR terminal of (A1), wherein said image processing circuit is configured to receive at least one image processing command from said microprocessor.

A11. The EIR terminal of (A1), wherein said image processing circuit is communicatively coupled to said microprocessor via at least one of: a memory, a memory-like interface.

A12. The EIR terminal of claim A1, wherein said communication interface is provided by one of: a wired communication interface, a wireless communication interface.

B1. An encoded information reading (EIR) terminal comprising:
a microprocessor;
a communication interface;
an image processing circuit communicatively coupled to said microprocessor;
a plurality of imaging assemblies of communicatively coupled to said image processing circuit via a standardized interface;
wherein each imaging assembly of said plurality of imaging assemblies is configured to output image frame data in a common format required by said standardized interface;
wherein each imaging assembly of said plurality of imaging assemblies comprises a two-dimensional image sensor configured to output an analog signal representative of light reflected by an object located within a field of view of said imaging assembly;
wherein said image processing circuit is configured to receive said image frame data from at least one imaging assembly of said plurality of imaging assemblies; and
wherein said EIR terminal is configured to output at least one of: image frame data comprising decodable indicia and decoded message data corresponding to said decodable indicia.

B2. The EIR terminal of (B1), wherein said standardized interface is provided by one of: a parallel interface, a serial interface.

B3. The EIR terminal of (B1), wherein said standardized interface is provided by one of: a MIPI camera parallel interface, a MIPI camera serial interface.

B4. The EIR terminal of (B1), wherein said image processing circuit is configured to simultaneously communicate with at least two imaging assemblies of said plurality of imaging assemblies.

B5. The EIR terminal of (B1), wherein said image processing circuit is configured to receive at least one image processing command from said microprocessor.

B6. The EIR terminal of (B1), further comprising one or more memory blocks communicatively coupled to said image processing circuit.

B7. The EIR terminal of (B6), wherein said image processing circuit is further configured to perform at least one of: buffering said image frame data received from at least one imaging assembly of said plurality of imaging assemblies in at least one memory block of said one or more memory blocks and processing said image frame data received from at least one imaging assembly of said plurality of imaging assemblies.

B8. The EIR terminal of (B6), wherein said image processing circuit is configured to simultaneously communicate with at least two memory blocks of said one or more memory blocks.

The invention claimed is:

1. An encoded information reading (EIR) terminal comprising:
a microprocessor;
a communication interface;
an image processing circuit communicatively coupled to said microprocessor;
a plurality of imaging assemblies communicatively coupled to said image processing circuit;
a plurality of memory blocks, one memory block for each of said plurality of imaging assemblies, and each memory block communicatively coupled to said image processing circuit;
wherein each imaging assembly of said plurality of imaging assemblies is configured to output image frame data;
wherein said image processing circuit is configured to perform at least one of: receiving said image frame data from at least one imaging assembly of said plurality of imaging assemblies, buffering said image frame data received from at least one imaging assembly of said plurality of imaging assemblies in at least one memory block of said memory blocks, and processing said image frame data received from at least one imaging assembly of said plurality of imaging assemblies; and
wherein said EIR terminal is configured to output at least one of: image frame data comprising decodable indicia and decoded message data corresponding to said decodable indicia.

2. The EIR terminal of claim 1, wherein each imaging assembly of said plurality of imaging assemblies comprises a two-dimensional image sensor configured to output an analog signal representative of light reflected by an object located within a field of view of said imaging assembly, an amplifier configured to output an amplified analog signal by amplifying an analog signal read out of said image sensor, and an analog-to-digital (A/D) converter configured to convert said analog signal into a digital signal representing said image frame data.

3. The EIR terminal of claim 1, wherein said image processing circuit is configured to simultaneously communicate with at least two imaging assemblies of said plurality of imaging assemblies.

4. The EIR terminal of claim 1, wherein said image processing circuit is configured to simultaneously communicate with at least two memory blocks of said memory blocks.

5. The EIR terminal of claim 1, wherein at least one imaging assembly of said plurality of imaging assemblies is communicatively coupled to said image processing circuit via one of: a parallel interface, a serial interface.

6. The EIR terminal of claim 1, wherein at least one imaging assembly of said plurality of imaging assemblies includes a monochrome image sensor.

7. The EIR terminal of claim 1, wherein at least one imaging assembly of said plurality of imaging assemblies includes a color image sensor.

8. The EIR terminal of claim 1, wherein said processing of said image frame data received from at least one imaging assembly comprises at least one of: filtering said image frame data, extracting a part of said image frame data.

9. The EIR terminal of claim 1, wherein said image processing circuit is provided by one of: a field-programmable gate array (FPGA), an application-specific integrated circuit (ASIC).

10. The EIR terminal of claim 1, wherein said image processing circuit is configured to receive at least one image processing command from said microprocessor.

11. The EIR terminal of claim 1, wherein said image processing circuit is communicatively coupled to said microprocessor via at least one of: a memory, a memory-like interface.

12. The EIR terminal of claim 1, wherein said communication interface is provided by one of: a wired communication interface, a wireless communication interface.

13. An encoded information reading (EIR) terminal comprising:
    a microprocessor;
    a communication interface;
    an image processing circuit communicatively coupled to said microprocessor;
    a plurality of imaging assemblies communicatively coupled to said image processing circuit via a standardized interface;
    wherein said standardized interface is provided by a MIPI camera parallel interface;
    wherein each imaging assembly of said plurality of imaging assemblies is configured to output image frame data in a common format required by said standardized interface;
    wherein each imaging assembly of said plurality of imaging assemblies comprises a two-dimensional image sensor configured to output an analog signal representative of light reflected by an object located within a field of view of said imaging assembly;
    wherein said image processing circuit is configured to receive said image frame data from at least one imaging assembly of said plurality of imaging assemblies; and
    wherein said EIR terminal is configured to output at least one of: image frame data comprising decodable indicia and decoded message data corresponding to said decodable indicia.

14. The EIR terminal of claim 13, wherein said standardized interface is provided by one of: a parallel interface, a serial interface.

15. The EIR terminal of claim 13, wherein said image processing circuit is configured to simultaneously communicate with at least two imaging assemblies of said plurality of imaging assemblies.

16. The EIR terminal of claim 13, wherein said image processing circuit is configured to receive at least one image processing command from said microprocessor.

17. The EIR terminal of claim 13, further comprising a plurality of memory blocks, one memory block for each of said plurality of imaging assemblies, and each memory block communicatively coupled to said image processing circuit.

18. The EIR terminal of claim 17, wherein said image processing circuit is further configured to perform at least one of: buffering said image frame data received from at least one imaging assembly of said plurality of imaging assemblies in at least one memory block of said memory blocks and processing said image frame data received from at least one imaging assembly of said plurality of imaging assemblies.

19. The EIR terminal of claim 17, wherein said image processing circuit is configured to simultaneously communicate with at least two memory blocks of memory blocks.

20. An encoded information reading (EIR) terminal comprising:
    a microprocessor;
    a communication interface;
    an image processing circuit communicatively coupled to said microprocessor;
    a plurality of imaging assemblies communicatively coupled to said image processing circuit via a standardized interface;
    a plurality of memory blocks, one memory block for each of said plurality of imaging assemblies, and each memory block communicatively coupled to said image processing circuit;
    wherein each imaging assembly of said plurality of imaging assemblies is configured to output image frame data in a common format required by said standardized interface;
    wherein each imaging assembly of said plurality of imaging assemblies comprises a two-dimensional image sensor configured to output an analog signal representative of light reflected by an object located within a field of view of said imaging assembly;
    wherein said image processing circuit is configured to receive said image frame data from at least one imaging assembly of said plurality of imaging assemblies; and
    wherein said EIR terminal is configured to output at least one of: image frame data comprising decodable indicia and decoded message data corresponding to said decodable indicia.

* * * * *